12) United States Patent
Zinn et al.

(10) Patent No.: US 8,927,637 B2
(45) Date of Patent: Jan. 6, 2015

(54) METAL SCAVENGING POLYMERS AND USES THEREOF

(75) Inventors: Paul J. Zinn, Montgomery, IL (US);
Winston Su, Woodbridge, IL (US);
Rebecca L. Stiles, Naperville, IL (US);
Darlington Mlambo, Naperville, IL (US)

(73) Assignee: Nalco Company, Naperville, IL (US)

( * ) Notice: Subject to any disclaimer, the term of this patent is extended or adjusted under 35 U.S.C. 154(b) by 253 days.

(21) Appl. No.: 13/538,030

(22) Filed: Jun. 29, 2012

(65) Prior Publication Data

US 2013/0131253 A1  May 23, 2013

Related U.S. Application Data

(63) Continuation-in-part of application No. 12/754,660, filed on Apr. 6, 2010, which is a continuation-in-part of application No. 12/754,683, filed on Apr. 6, 2010, now Pat. No. 8,211,389.

(51) Int. Cl.
C08K 3/08 (2006.01)
C02F 1/28 (2006.01)
C02F 1/56 (2006.01)
C08L 79/02 (2006.01)
C08G 73/02 (2006.01)
B01D 53/64 (2006.01)
C08G 73/06 (2006.01)
C08L 79/04 (2006.01)
C02F 101/10 (2006.01)
C02F 1/66 (2006.01)
C02F 101/20 (2006.01)
C02F 103/18 (2006.01)

(52) U.S. Cl.
CPC ............ *C08G 73/0206* (2013.01); *C02F 1/285* (2013.01); *C02F 2101/103* (2013.01); *C02F 1/56* (2013.01); *C08L 79/02* (2013.01); *C08G 73/0273* (2013.01); *C02F 1/66* (2013.01); *C02F 2101/206* (2013.01); *B01D 53/64* (2013.01); *C08G 73/028* (2013.01); *C02F 2101/20* (2013.01); *C02F 2101/203* (2013.01); *C08G 73/0616* (2013.01); *C02F 2101/106* (2013.01); *C08L 79/04* (2013.01); *C02F 2103/18* (2013.01)
USPC ............... 524/440; 423/22; 423/42; 423/102; 423/243.02; 423/243.05; 524/439; 524/606; 524/608; 525/343; 525/451; 528/310

(58) Field of Classification Search
USPC .................. 423/22, 42, 102, 423.02, 243.05; 524/440; 525/439, 451; 528/310
See application file for complete search history.

(56) References Cited

U.S. PATENT DOCUMENTS

| 4,039,446 A | 8/1977 | Ban et al. |
| 4,435,548 A | 3/1984 | Tomalia et al. |
| 4,451,351 A | 5/1984 | Porter et al. |
| 4,670,180 A | 6/1987 | Moriya et al. |
| 4,731,187 A | 3/1988 | Moriya et al. |
| 5,164,095 A | 11/1992 | Sparapany et al. |
| 5,346,627 A | 9/1994 | Siefert et al. |
| 5,500,133 A | 3/1996 | Carey et al. |
| 5,510,040 A | 4/1996 | Miller et al. |
| 5,523,002 A | 6/1996 | Carey et al. |
| 5,658,487 A | 8/1997 | Carey et al. |
| 5,854,173 A | 12/1998 | Chang et al. |
| 6,398,039 B1 | 6/2002 | Xue et al. |
| 6,403,726 B1 | 6/2002 | Ward |
| 6,521,021 B1 | 2/2003 | Pennline et al. |
| 6,527,828 B2 | 3/2003 | Flippo et al. |
| 6,667,384 B2 | 12/2003 | Gu et al. |
| 6,808,692 B2 | 10/2004 | Oehr |
| 6,818,043 B1 | 11/2004 | Chang et al. |
| 6,878,358 B2 | 4/2005 | Vosteen et al. |
| 6,953,494 B2 | 10/2005 | Nelson, Jr. |
| 7,473,303 B1 | 1/2009 | Higgins et al. |
| 7,713,503 B2 | 5/2010 | Maly et al. |
| 7,776,780 B1 | 8/2010 | Granite et al. |
| 8,110,163 B2 | 2/2012 | Keiser et al. |
| 8,142,548 B2 | 3/2012 | Higgins et al. |
| 8,211,389 B2 | 7/2012 | Zinn et al. |
| 2003/0104969 A1 | 6/2003 | Caswell et al. |
| 2003/0110948 A1 | 6/2003 | Gaita et al. |

(Continued)

FOREIGN PATENT DOCUMENTS

EP 0506132 A1 9/1992
JP 57-091785 A 6/1982

(Continued)

OTHER PUBLICATIONS

Alvarez et al., "Thermal and Mechanical Properties of Halogen-Containing Aromatic Polymaides," *Macromol. Chem. Phys.*, 202:16 (2002), pp. 3142-3148.
Benson et al., "Pilot- and Full-Scale Demonstration of Advanced Mercury Control Technologies for Lignite-Fired Power:Plants," Final Report, DOE/NETL (Feb. 2005), 97 pp.
Blythe et al., "Bench-scale Kinetics Study of Mercury Reactions in FGD Liquors," Semiannual Technical Progress Report, URS Corp. (Sep. 30, 2006), pp. 1-36.
Depriest et al., "Economics of Lime and Limestone for Control of Sulfur Dioxide," Paper #169, National Lime Assoc. (May 2003), pp. 1-25.

(Continued)

*Primary Examiner* — Gregory Listvoyb
(74) *Attorney, Agent, or Firm* — Leydig, Voit & Mayer, Ltd.

(57) ABSTRACT

A polymer, a composition, and uses for either are disclosed. The polymer is derived from at least two monomers: acrylic-x and an alkylamine, and has attached to the polymer backbone a functional group capable of scavenging at least one metal. The polymer has a polymer backbone with a fluorescing quantity of conjugated double bonds, thereby providing a method for controlling metal scavenging via fluorescence. These polymers have many uses in various media, including wastewater systems.

31 Claims, 12 Drawing Sheets

(56) References Cited

U.S. PATENT DOCUMENTS

| | | |
|---|---|---|
| 2004/0045437 A1 | 3/2004 | Chang et al. |
| 2005/0000901 A1 | 1/2005 | Campbell et al. |
| 2005/0040108 A1 | 2/2005 | Jay |
| 2005/0147549 A1 | 7/2005 | Lissianski et al. |
| 2007/0056706 A1 | 3/2007 | Crisp et al. |
| 2007/0248512 A1 | 10/2007 | Kawawa et al. |
| 2008/0202396 A1 | 8/2008 | Aradi et al. |

FOREIGN PATENT DOCUMENTS

| | | | |
|---|---|---|---|
| JP | 08-173936 A | | 7/1996 |
| JP | 2000-015222 | * | 1/2000 |
| JP | 2000-015222 A | | 1/2000 |
| JP | 2000-063794 A | | 2/2000 |

OTHER PUBLICATIONS

Depriest et al., "Wet Flue Gas Desulfurization Technology Evaluation," National Lime Assoc. (Jan. 2003), 50 pp.

Edison Electric Institute, "Mercury Control Technologies for Coal-Based Power Plants," (Aug. 2005), 2 pp.

Glater et al., "The search for a chlorine-resistant reverse osmosis membrane," *Desalination*, 95 (1994), pp. 325-345.

Kang et al., "Preparation and Properties of Aromatic Polyamide Homologs Containing Chlorine Substituents," *J. of Applied Polymer Sci.*, 77 (2000), pp. 1387-1392.

McCubbin et al., "Dithiocarbamate-Functionalized Dendrimers as Ligands for Metal Complexes," *Inorg. Chem.*, 37:15 (1998), pp. 3753-3758.

Miller et al., "Mercury Capture and Fate Using Wet FGD at Coal-Fired Power Plants," *DOE/NETL Mercury and Wet FGD R&D*, (Aug. 2006), pp. 1-37.

* cited by examiner

Physical-Chemical Method for Heavy Metal/Pollutant Removal a b a

P⁺ − 2 = One double bond    P⁺ − 4 = Two double bonds    P⁺ − 6 = 3 double bonds b

METAL SCAVENGING POLYMERS AND USES THEREOF

This application is a continuation-in-part application of U.S. patent application Ser. No. 12/754,660, filed Apr. 6, 2010, and U.S. patent application Ser. No. 12/754,683, filed Apr. 6, 2010, now U.S. Pat. No. 8,211,389 the disclosures of which are herein incorporated by reference.

FIELD OF THE INVENTION

The field of the invention pertains to novel fluorescing metal-scavenging polymers and methods of use thereof.

BACKGROUND OF THE INVENTION

Metal scavenging for various media, such as process water and air, have been a challenge for various industries, including heavy and light industry, such as power plants and mining operations. In addition, metal scavenging for process water has been an object for municipal applications as well. An exemplary wastewater treatment scheme is illustrated in FIG. 1.

The present disclosure addresses various avenues for handling metals management in industrial and municipal processes. These chemistries could be potentially utilized for other various applications that require metal scavenging, and more particularly, could provide a technology that allows for online dosage control of metal-scavenging chemistries.

SUMMARY OF THE INVENTION

The present disclosure provides for a polymer or a composition comprising the polymer, the polymer comprising a polymer backbone, the polymer backbone comprising chemical bonds, wherein the polymer backbone is derived from at least two monomers: acrylic-x and an alkylamine, and wherein the acrylic-x has the following formula:

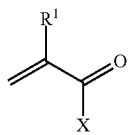

wherein X=OR, OH and salts thereof, or $NHR^2$, wherein R is independently selected from an alkyl group, an aryl group, and an alkene group; and wherein $R^1$ and $R^2$ are independently selected from H, an alkyl group, an aryl group, and an alkene group; wherein the molecular weight of the polymer backbone is between 500 to 200,000 Daltons; wherein the chemical bonds of the polymer backbone are comprised of a fluorescing quantity of conjugated double bonds; and wherein the polymer is functionalized by attaching to the polymer backbone a functional group capable of scavenging at least one metal in a medium.

Additionally, the present disclosure provides for a method of removing at least one metal from a medium comprising the at least one metal, the method comprising: treating the medium comprising the at least one metal with a polymer, the polymer comprising a polymer backbone, the polymer backbone comprising chemical bonds, the polymer backbone derived from at least two monomers: acrylic-x and an alkylamine, and wherein the acrylic-x has the following formula:

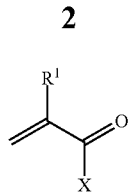

wherein X=OR, OH and salts thereof, or $NHR^2$, wherein R is independently selected from an alkyl group, an aryl group, and an alkene group; and wherein $R^1$ and $R^2$ are independently selected from H, an alkyl group, an aryl group, and an alkene group; wherein the molecular weight of the polymer backbone is between 500 to 200,000 Daltons; wherein the chemical bonds of the polymer backbone are comprised of a fluorescing quantity of conjugated double bonds; and wherein the polymer is functionalized by attaching to the polymer backbone a functional group capable of scavenging the at least one metal; allowing the polymer to scavenge a quantity of the at least one metal to create a scavenged compound; and collecting the scavenged compound.

BRIEF DESCRIPTION OF THE DRAWINGS

The advantages of the present disclosure will become more readily apparent to those of ordinary skill in the relevant art after reviewing the following detailed description and accompanying drawings, wherein.

DETAILED DESCRIPTION OF THE INVENTION

Figure 1:
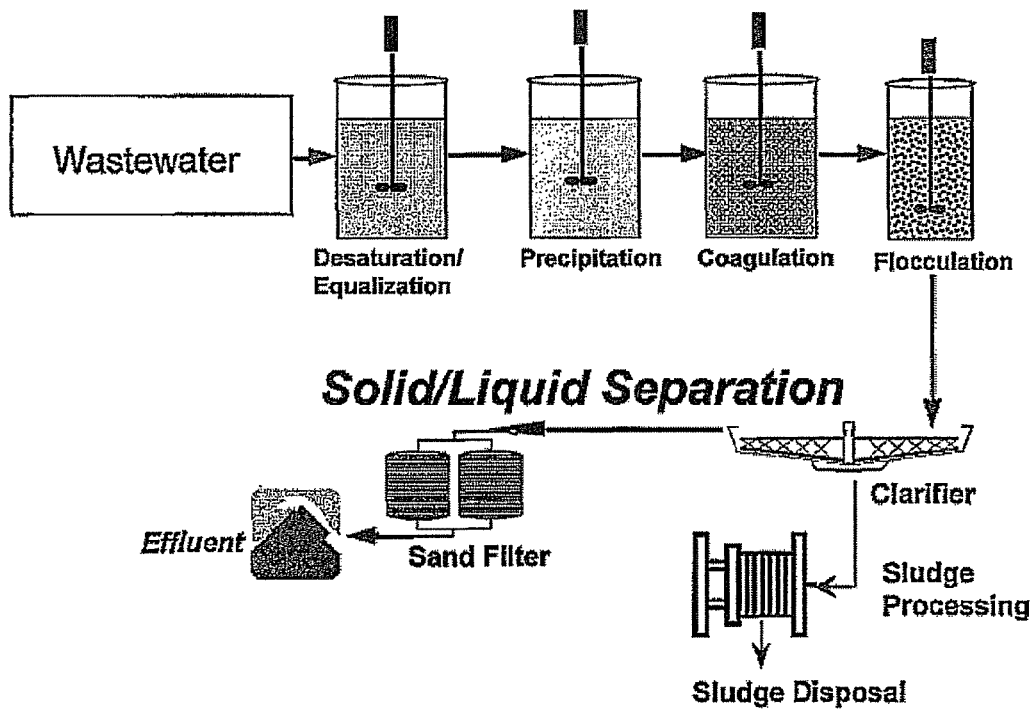
FIG. 1 illustrates an exemplary wastewater treatment scheme.

While the embodiments described herein may take various forms, there is shown in the drawings and will hereinafter be described presently preferred embodiments with the understanding that the present disclosure is to be considered merely an exemplification and is not intended to limit the disclosure to the specific embodiments illustrated.

It should be further understood that the title of this section of this specification, namely, "Detailed Description of the Invention," relates to a requirement of the United States Patent Office, and does not imply, nor should be inferred to limit the subject matter disclosed herein.

A. Polymers and Compositions

The present disclosure provides for a polymer or a composition comprising the polymer, the polymer comprising a polymer backbone, the polymer backbone comprising chemical bonds, wherein the polymer backbone is derived from at least two monomers: acrylic-x and an alkylamine, and wherein the acrylic-x has the following formula:

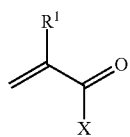

wherein X=OR, OH and salts thereof, or $NHR^2$, wherein R is independently selected from an alkyl group, an aryl group, and an alkene group; and wherein $R^1$ and $R^2$ are independently selected from H, an alkyl group, an aryl group, and an alkene group; wherein the molecular weight of the polymer backbone is between 500 to 200,000 Daltons; wherein the chemical bonds of the polymer backbone are comprised of a fluorescing quantity of conjugated double bonds;

and wherein the polymer is functionalized by attaching to the polymer backbone a functional group capable of scavenging at least one metal in a medium.

In certain embodiments, the alkylamine has a range of carbon atoms from 2 to 14, and a range of nitrogen atoms from 2 to 8.

In certain embodiments, R has a range of carbon atoms from 1 to 24.

In certain embodiments, $R^1$ has a range of carbon atoms from 1 to 24.

In certain embodiments, $R^2$ has a range of carbon atoms from 1 to 24.

In certain embodiments, the conjugated double bonds comprise at least 10% of the chemical bonds of the polymer backbone. In other embodiments, the conjugated double bonds comprise at least 20% of the chemical bonds of the polymer backbone.

The at least one metal can include zero valent, monovalent, and multivalent metals. The at least one metal may or may not be ligated by organic or inorganic compounds. Also, the at least one metal can be radioactive and nonradioactive. Examples include, but are not limited to, transition metals and heavy metals. Specific metals can include, but are not limited to: copper, nickel, zinc, lead, mercury, cadmium, silver, iron, manganese, palladium, platinum, strontium, selenium, arsenic, cobalt, gold, and combinations thereof.

As previously discussed, the molecular weight of the polymer backbone can vary according to various considerations. For example, the target species and/or application for the polymers may be considered. Another consideration can be monomer selection. While molecular weight can be measured and/or calculated by various means, the molecular weight measurements of this disclosure were performed by size exclusion chromatography.

When molecular weight is mentioned in the application, it is referring to the molecular weight for the unmodified polymer, otherwise referred to as the polymer backbone. The functional groups that are added to the polymer backbone are not part of the calculation unless expressly stated. Thus, the molecular weight of the polymer including functional groups can far exceed any recited molecular weight range.

In certain embodiments, the molecular weight of the polymer backbone is from 1,000 to 16,000 Daltons.

In certain embodiments, the molecular weight of the polymer backbone is from 1,500 to 8,000 Daltons.

As previously discussed, a functional group is attached to the polymer backbone. The functional group is capable of binding to one or more metals, wherein the term "metals" includes metal-comprising compounds. Additionally, the term "a functional group" is used to denote that one or any number of functional groups may be attached to the polymer backbone. More than one functional group may be attached to the polymer backbone, but a single functional group would be within the scope of the disclosure.

In certain embodiments, the functional group comprises at least one sulfide compound.

In certain embodiments, the functional group is a dithiocarbamate salt group.

In certain embodiments, the fluorescing metal-scavenging polymer is part of a composition. In certain embodiments, the composition may further comprise water.

In certain embodiments, the composition may further comprise a quantity of the medium comprising the at least one metal.

In certain embodiments, the composition may further comprise at least one metal selected from the group consisting of: copper, nickel, zinc, lead, mercury, cadmium, silver, iron, manganese, palladium, platinum, strontium, selenium, arsenic, cobalt, gold, and any combination thereof.

In certain embodiments, the composition may further comprise water soluble ethylene dichloride ammonia polymer having a polymer backbone with a molecular weight of from 500 to 100,000 Daltons, which is functionalized from 5 to 50 percent with dithiocarbamate salt groups. The diothiocarbamate is the functional group that results from reaction of the unfunctionalized polymer with carbon disulfide.

In certain embodiments, the functional groups of the fluorescing metal-scavenging polymer are at least one of the following: alkylene phosphate groups, alkylene carboxylic acids and salts thereof, oxime groups, amidooxime groups, dithiocarbamic acids and salts thereof, hydroxamic acids, and nitrogen oxides.

The functionalization, i.e., the molar amounts of the functional group relative to the total amines of the polymer backbone, can vary as well. For example, the reaction of 3 molar equivalents of carbon disulfide to a 1:1 mole ratio acrylic acid/tetraethylene pentamine copolymer ("TEPA"), which comprises 4 molar equivalents of amines per repeat unit after polymerization, will result in a polymer that is functionalized 75 percent, i.e., has dithiocarbamate salt group attached to the polymer backbone at 75 percent of the total possible bonding sites. In other words, 75 percent of the total amines in the polymer backbone have been converted to dithiocarbamate salt groups.

In certain embodiments, the fluorescing metal-scavenging polymer is between 5 to 100 percent functionalized with dithiocarbamate salt groups. In other embodiments, the polymer is between 25 to 90 percent functionalized with dithiocarbamate salt groups. In yet other embodiments, the polymer is between 55 to 80 percent functionalized with dithiocarbamate salt groups.

As previously discussed, the fluorescing metal-scavenging polymer disclosed herein contains a polymer backbone derived from at least two monomers: acrylic-x and an alkylamine. The alkylamines may vary in kind.

In certain embodiments, the alkylamine is at least one of the following: an ethyleneamine, a polyethylenepolyamine, ethylenediamine ("EDA"), diethylenetriamine ("DETA"), triethylenetetraamine ("TETA"), tetraethylenepentamine ("TEPA"), and pentaethylenehexamine ("PEHA").

The acrylic-x monomer group can vary as well.

In certain embodiments, the acrylic-x is at least one of the following: methyl acrylate, methyl methacrylate, ethyl acrylate, and ethyl methacrylate, propyl acrylate, and propyl methacrylate.

In certain embodiments, the acrylic-x is at least one of the following: acrylic acid and salts thereof, methacrylic acid and salts thereof, acrylamide, and methacrylamide.

The molar ratio between monomers that make up the fluorescing metal-scavenging polymer can vary. More specifically, the relative amounts of acrylic-x and alkylamine can vary and may depend upon the resultant polymer product that is desired. The molar ratio used is defined as the moles of acrylic-x divided by the moles of alkylamine.

In certain embodiments, the molar ratio between acrylic-x and alkylamine is from 0.85 to 1.5.

In certain embodiments, the molar ratio between acrylic-x and alkylamine is from 1.0 to 1.2.

In certain embodiments, the acrylic-x is an acrylic ester and the alkylamine is selected from the group consisting of PEHA, TEPA, DETA, TETA, EDA, and any combination thereof. In certain of these embodiments, the molar ratio between acrylic-x and alkylamine is from 0.85 to 1.5. In yet other embodiments, the molecular weight of the polymer backbone can encompass ranges: 500 to 200,000, 1,000 to 16,000, or 1,500 to 8,000. In other embodiments, the acrylic ester can be at least one of the following: methyl acrylate, methyl methacrylate, ethyl acrylate, and ethyl methacrylate, propyl acrylate, and propyl methacrylate, which is combined with at least one alklyamine, which may include PEHA, TEPA, DETA, TETA, or EDA. In other embodiments, the resulting polymer is functionalized to comprise the following ranges of dithiocarbamate salt groups: 5 to 100 percent functionalization, 25 to 90 percent functionalization, 55 to 80 percent functionalization.

In certain embodiments, the acrylic-x is acrylamide and the alkylamine is selected from the group consisting of: TEPA, DETA, TETA, and EDA. In other embodiments, the molar ratio between acrylic-x and alkylamine is from 0.85 to 1.5. In yet other embodiments, the molecular weight of the fluorescing metal-scavenging polymer can encompass ranges: 500 to 200,000, 1,000 to 16,000, or 1,500 to 8,000 Daltons. In yet other embodiments, the acrylic amide can be at least one of acrylamide and methacrylamide, which is combined with at least one of the alklyamines, which may include at least one of the following: PEHA, TEPA, DETA, TETA, EDA. In other embodiments, the resulting polymer is functionalized to comprise the following ranges of dithiocarbamate salt groups: 5 to 100 percent functionalization, 25 to 90 percent functionalization, 55 to 80 percent functionalization, or at least 55 percent functionalization.

In certain embodiments, the functional group of the fluorescing metal-scavenging polymer is a dithiocarbamate salt group and the polymer is between 5 and 100 percent functionalized with the dithiocarbamate salt group based upon the total possible functionalization of the polymer backbone.

In certain embodiments, the acrylic-x is an acrylic acid or salts thereof and the alkylamine is selected from the group consisting of: PEHA, TEPA, DETA, TETA, EDA, and any combination thereof. In other embodiments, the molar ratio between acrylic-x and alkylamine is from 0.85 to 1.5. In yet other embodiments, the molecular weight of the polymer backbone can encompass ranges: 500 to 200,000, 1,000 to 16,000, or 1,500 to 8,000 Daltons. In other embodiments, the acrylic acid can be at least one of acrylic acid or salts thereof and methacrylic acid or salts thereof which is combined with at least one of the alklyamines, which may include TEPA, DETA, TETA, or EDA. In yet other embodiments, the resulting polymer is functionalized to comprise the following ranges of dithiocarbamate salt groups: 5 to 100 percent functionalization, 25 to 90 percent functionalization, 55 to 80 percent functionalization, or at least 55 percent functionalization.

In addition to acrylic-x and alkylamine, other monomers may be integrated into the polymer backbone. A condensation polymer reaction scheme can be utilized to prepare the polymer backbone. Various synthesis methods can be utilized to functionalize the polymer with, for example, dithiocarbamate and/or other non-metal-scavenging functional groups.

Moreover, the composition of the present disclosure can be formulated with other polymers such as those disclosed in U.S. Pat. No. 5,164,095, herein incorporated by reference, specifically, a water soluble ethylene dichloride ammonia polymer having a molecular weight of from 500 to 100,000 which is functionalized from 5 to 50 percent with dithiocarbamate salt groups. In certain embodiments, the molecular weight of the polymer backbone of the water soluble ethylene dichloride ammonia polymer is from 1500 to 5000 Daltons and is functionalized from 15 to 50 percent with dithiocarbamate salt groups. In other embodiments, the molecular weight of the polymer backbone of the water soluble ethylene dichloride ammonia polymer is from 1500 to 5000 and is functionalized from 25 to 40 percent with dithiocarbamate salt groups.

Also, the fluorescing metal-scavenging polymer of the present disclosure can be functionalized with other small molecule sulfide precipitants such as sodium sulfide, sodium hydrosulfide, TMT-15® (sodium or calcium salts of trimer-capto-S-triazine; Evonik Industries Corporation 17211 Camberwell Green Lane, Houston, Tex. 77070, USA), dimethyldithiocarbamate and diethyldithiocarbamate.

In certain embodiments, the polymer backbone consists of fluorescing poly(acrylic-x/alkylamine). Embodiments of non- and lesser-fluorescing poly(acrylic-x/alkylamine) polymer backbones are defined in the parent applications (U.S. patent application Ser. No. 12/754,660, filed Apr. 6, 2010, and U.S. patent application Ser. No. 12/754,683, filed Apr. 6, 2010). The polymer backbones of the present disclosure can be polymerized at temperatures greater than that disclosed in the parent applications, e.g., above 160° C. during polymerization/dehydration, which creates polymer backbones that fluoresce more intensely. The polymer of the present disclosure is functionalized by chemically attaching at least one metal-scavenging functional group to the polymer backbones. While not wishing to be bound to a particular theory, elevated temperatures employed during the preparation of the polymer backbone of the present disclosure are believed to drive a secondary, higher energy condensation/dehydration reaction during the condensation polymerization, consequently resulting in an increased amount of the fluorophore that is responsible for the strong light-absorbing and fluorescing properties of the polymers described herein. A potential chemical reaction sequence is proposed below. The increased amount of fluorophore in the polymer backbone of the present disclosure is believed to be a result of an increased formation of conjugated double bonds via the secondary, higher energy condensation/dehydration reaction. The proposed fluorophore mechanism and structure is shown below.

TABLE 1

GPC/DRI/FL data of acrylic-x/alkylamine polymers derived from acrylic acid and tetraethylene pentamine prepared at different temperatures.

| Sample | Mw (Dalton) | Fluorescence Peak Area[1] (mV * min) | Polymerization Temperature (° C.) |
| --- | --- | --- | --- |
| 6216-001 | 5,000 | 62 (64) | 160 |
| 6216-029 | 4,700 | 399 (405) | 185 |
| 6216-032 | 3,800 | 747 (750) | 210 |
| 6216-063 | 3,000 | 1040 (1045) | 225 |
| 6216-070 | 3,000 | 1040 (1045) | 225 |

Figure 4:
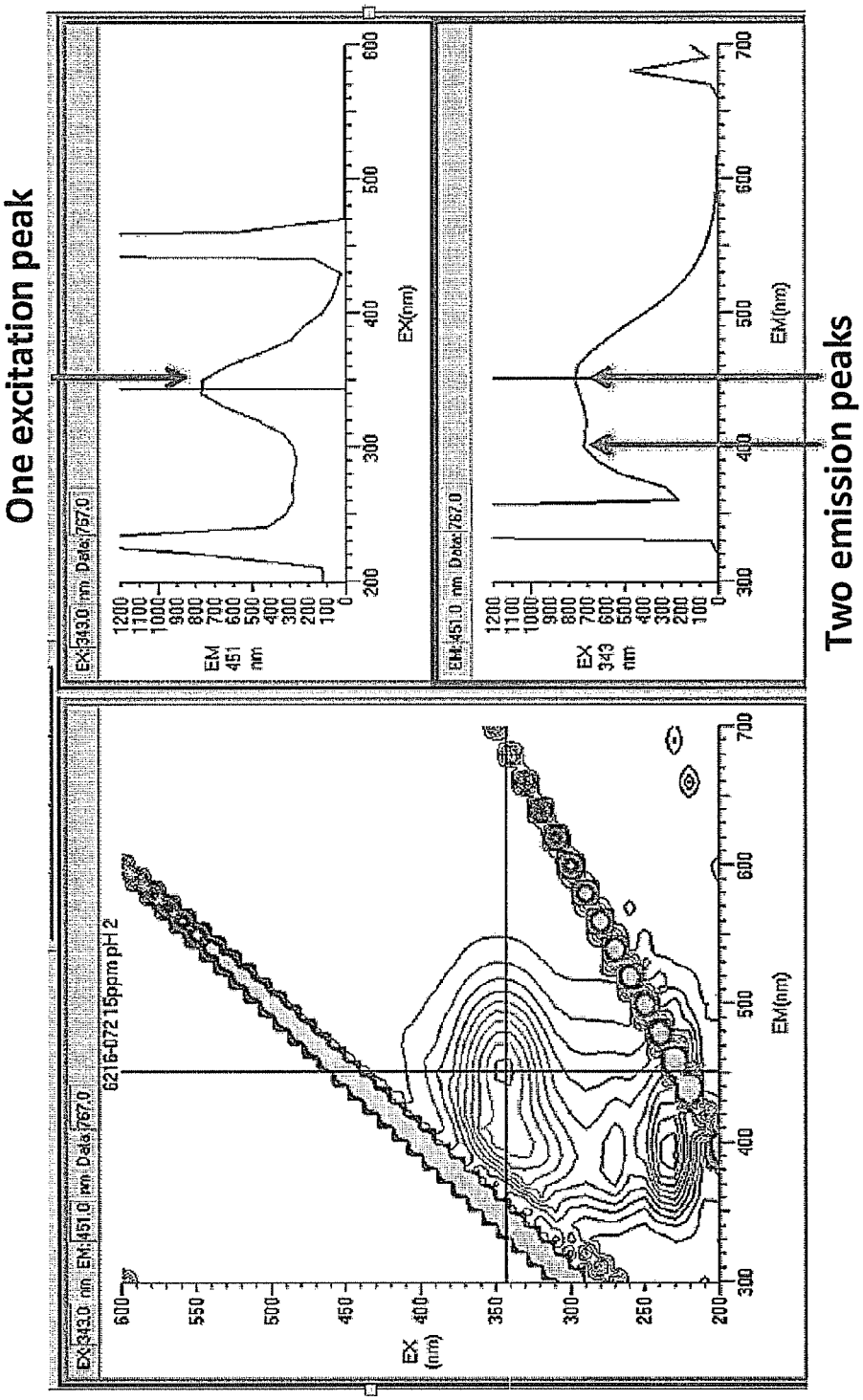
FIG. 4 illustrates an exemplary fluorescence spectra of a specific fluorescing metal-scavenging polymer derived from the high-temperature processed acrylic-x/alkylamine polymer backbone.

[1]EX/EM: 360/480 (nm), data in parenthesis are from flow injection without GPC columns The fluorescence spectra for a fluorescing metal-scavenging polymer, where the fluorescing metal-scavenging polymer is defined as a dithiocarbamate functionalized polymer derived from the reaction of carbon disulfide with a polymer backbone comprising poly(acrylic acid/tetraethylene pentamine), the polymer backbone having conjugated double bonds that allow for fluorescence detection, is shown in FIG. 4 (deionized water at pH 2). Table 1 above clearly illustrates the increased fluorescing properties with increasing polymerization temperature. In this case, it can be seen that there is one excitation peak (broad range of ~310-390 nm) and two emission peaks (ranges ~390-550 nm) under these condi-

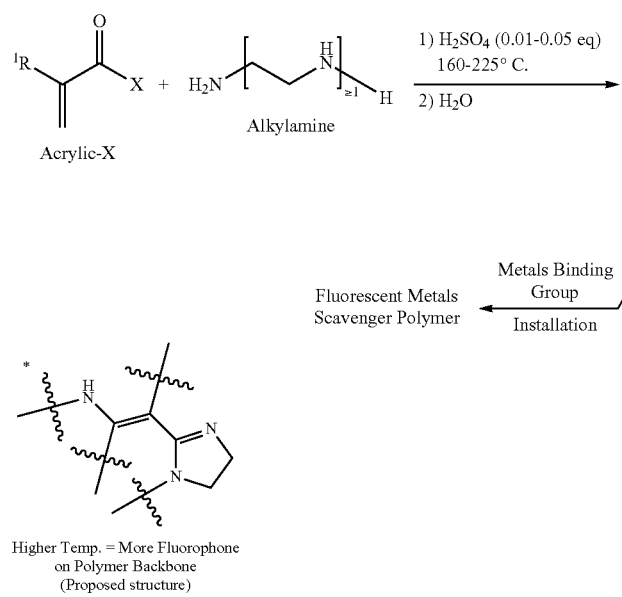

Higher Temp. = More Fluorophone on Polymer Backbone (Proposed structure)

Figure 2:
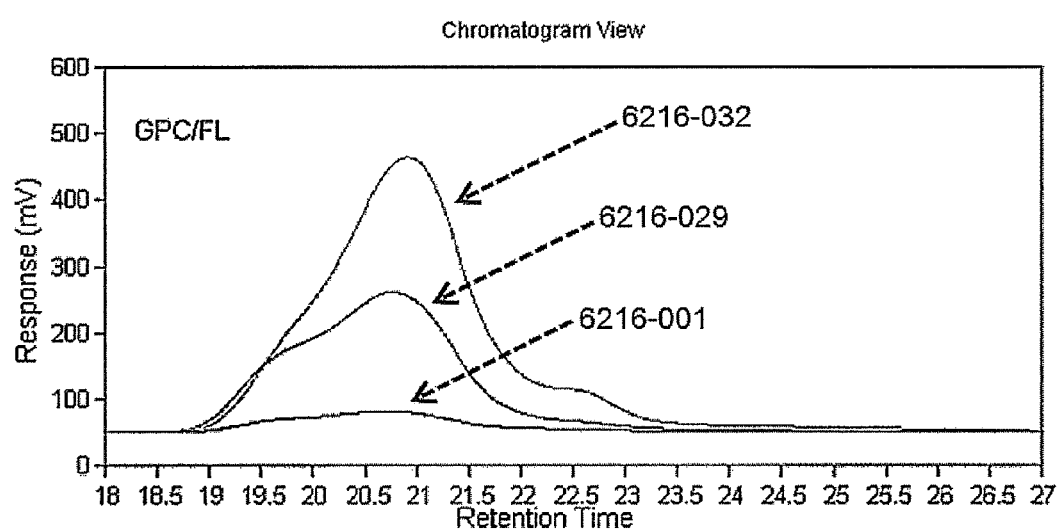
FIG. 2 illustrates a GPC chromatogram resulting from a fluorometer detector ("GPC/FL") on three different acrylic-alkylamine polymers derived from acrylic acid and tetraethylene pentamine, with the polymer backbones produced at varying temperatures.
Figure 3:
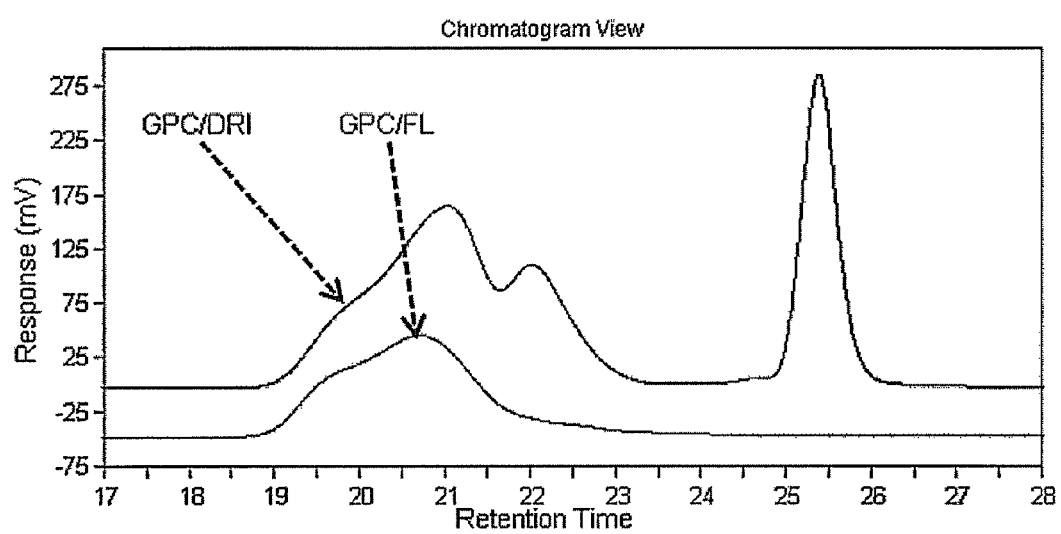
FIG. 3 illustrates a GPC chromatogram comparing fluorometer (also "GPC/FL") and differential refractive index ("GPC/DRI") detector responses of an acrylic-x/alkylamine polymer derived from acrylic acid and tetraethylene pentamine.

It has been determined that the fluorophore that is formed from the extended condensation/dehydration at higher temperatures remains covalently attached to the polymer backbone as shown in molecular weight determination work using gel permeation chromatography ("GPC") with differential refractive index ("DRI") and fluorescence ("FL") detectors (Table 1 below, and FIGS. 2 and 3). The fluorescent intensity of the resulting polymer backbone increases as the temperature is increased during preparation of the polymer backbone.

Table 1 lists various polymer backbone samples that were prepared and analyzed. Note: Sample 6216-070 was prepared in the same manner as Sample 6216-063.

tions. For this example, higher intensities were obtained when spectra were obtained after adjustment of the solution below pH 4. The relative intensities based on dosage are shown in the calibration curve displayed in FIG. 5.

The amount of conjugated double bonding in a polymer backbone can be detected via Matrix Assisted Laser Desorption Ionization—Time of Flight Mass Spectroscopy (MALDI-TOF-MS). Two of the samples listed in Table 1 were analyzed using this method: 6216-001 ("the 001 sample") and 6216-070 ("the 070 sample"). The polymer backbone of the 001 sample was prepared using the method illustrated in the parent applications, i.e., the polymer backbone was prepared at a polymerization temperature of 160° C.

The polymer backbone of the 070 sample was prepared at a polymerization temperature of 225° C.

Figure 6:
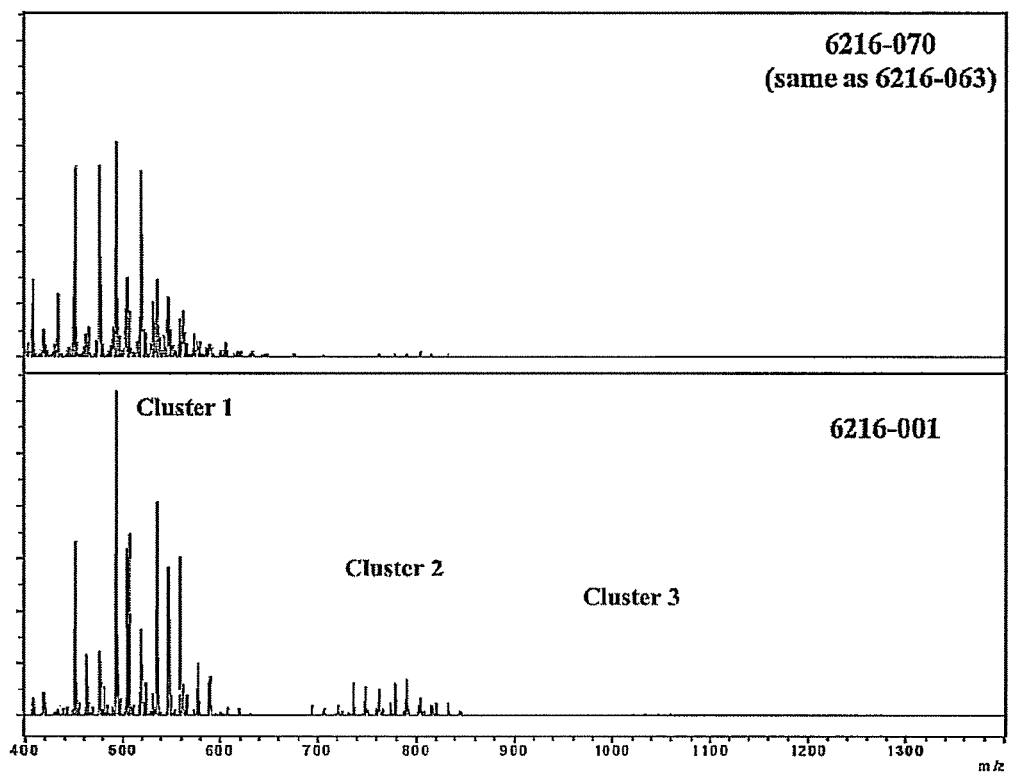
FIG. 6 illustrates Matrix Assisted Laser Desorption Ionization—Time of Flight Mass Spectroscopy data for polymer Samples 6216-070 (FIGS. 6a) and 6216-001 (FIG. 6b)
Figure 7:
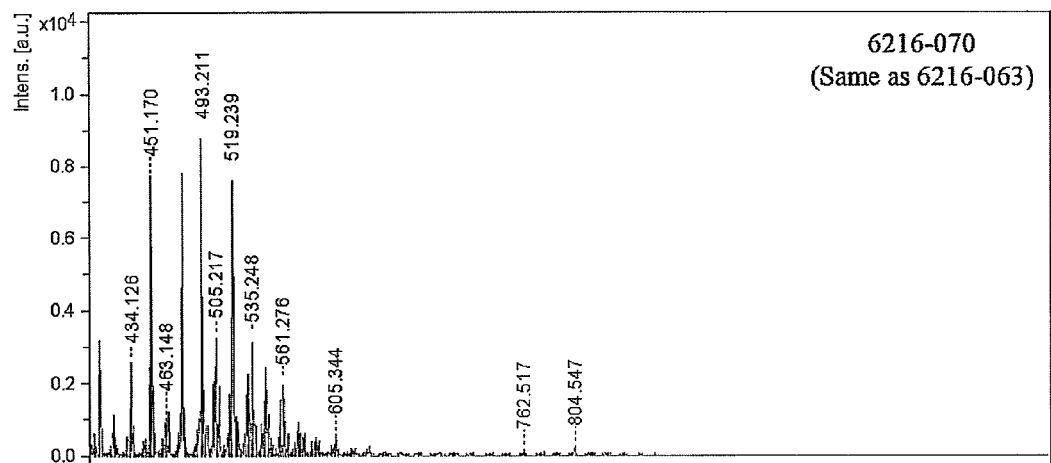
FIG. 7 illustrates Matrix Assisted Laser Desorption Ionization—Time of Flight Mass Spectroscopy data for polymer Samples 6216-070 (FIGS. 7a) and 6216-001 (FIG. 7b), the same as FIG. 6 but adding a brief description regarding the higher molecular weight portion of the polymers.
Figure 7:
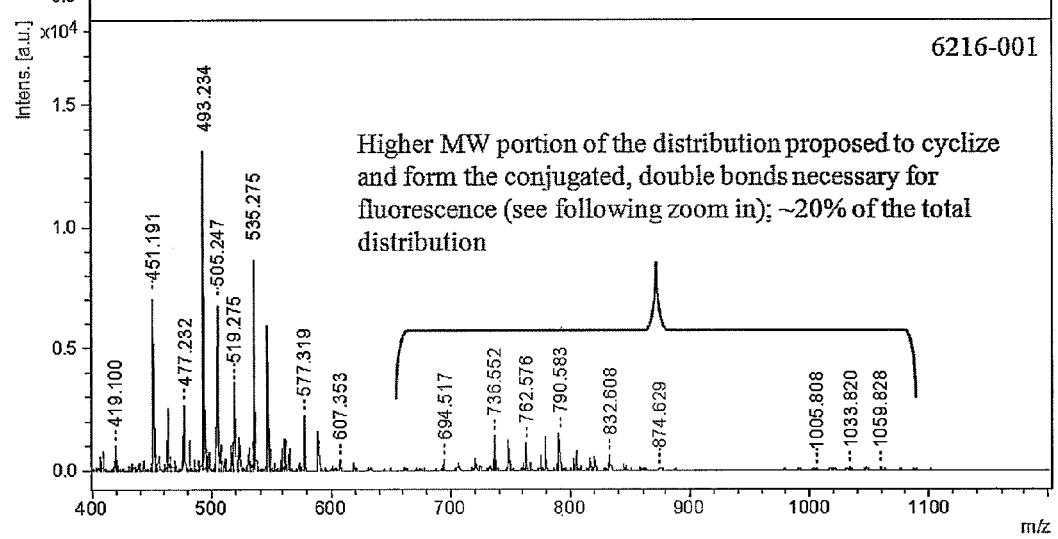

The two samples were analyzed using an alpha-cyano-4-hydroxy-cinnamic acid ("CHCA") prespotted plate with and without sodium trifluoroacetate ("NaTFA"). Additional analysis included a mixture of dihydroxybenzoic acid ("DHB") with silver trifluoroacetate ("AgTFA") or sodium chloride on a regular metal plate. While the results were similar for all of the analyses, differences in the two samples are described below and in the spectra illustrated in FIGS. 6-8. Referring to FIGS. 6 and 7, particularly FIGS. 6b and 7b, the illustrated spectra demonstrate that the 001 sample contains three clusters of what appears to be a replicating species. The clusters have mass to charge ratios ("m/z") ranging from 440-600, 700-850, and 990-1080 m/z. For the 001 samples, Clusters 2 and 3 represent approximately 20% of the overall mass of the sample. For the corresponding spectrum for the 070 sample, illustrated in FIGS. 6a and 7a, Cluster 2 is significantly smaller and Cluster 3 does not appear at all. Cluster 1 appears more dense for the 070 sample, and this phenomenon is further analyzed below and in FIG. 8. While MALDI may not be a quantitative instrument, some conclusions can be drawn from the data and follow.

Because it is polymerized at a temperature greater than 160° C., the 070 sample proceeds through a process by which the higher molecular weight-to-charge ("m/z") portion of the m/z distribution is cleaved, thereby concentrating conjugated double bonds within the lower m/z portion. The greater concentration of conjugated double bonds contribute to the greater density of peaks in the lower m/z cluster range (440-600 m/z). The GPC/DRI analysis supports this conclusion as well.

In certain embodiments, the polymer backbone of the fluorescing metal-scavenging polymer disclosed herein has been polymerized within a temperature range of greater than 160 degrees Celsius to 225 degrees Celsius. In certain embodiments, the polymer backbone has been polymerized at a temperature of at least 190 degrees Celsius. In certain embodiments, the polymer backbone has been polymerized at a temperature of at least 200 degrees Celsius. In certain embodiments, the polymer backbone has been polymerized at a temperature of at least 210 degrees Celsius. In certain embodiments, the polymer backbone has been polymerized at a temperature of at least 220 degrees Celsius. In certain embodiments, the polymer backbone has been polymerized at a temperature of 225 degrees Celsius.

This loss of a higher m/z species is indicative of one of the polymer branches or ends cyclizing and cleaving a portion of the long amine based chain (represented by a lower overall mass) and/or an increase in overall polymer charge (represented by a greater overall charge).

Figure 8:
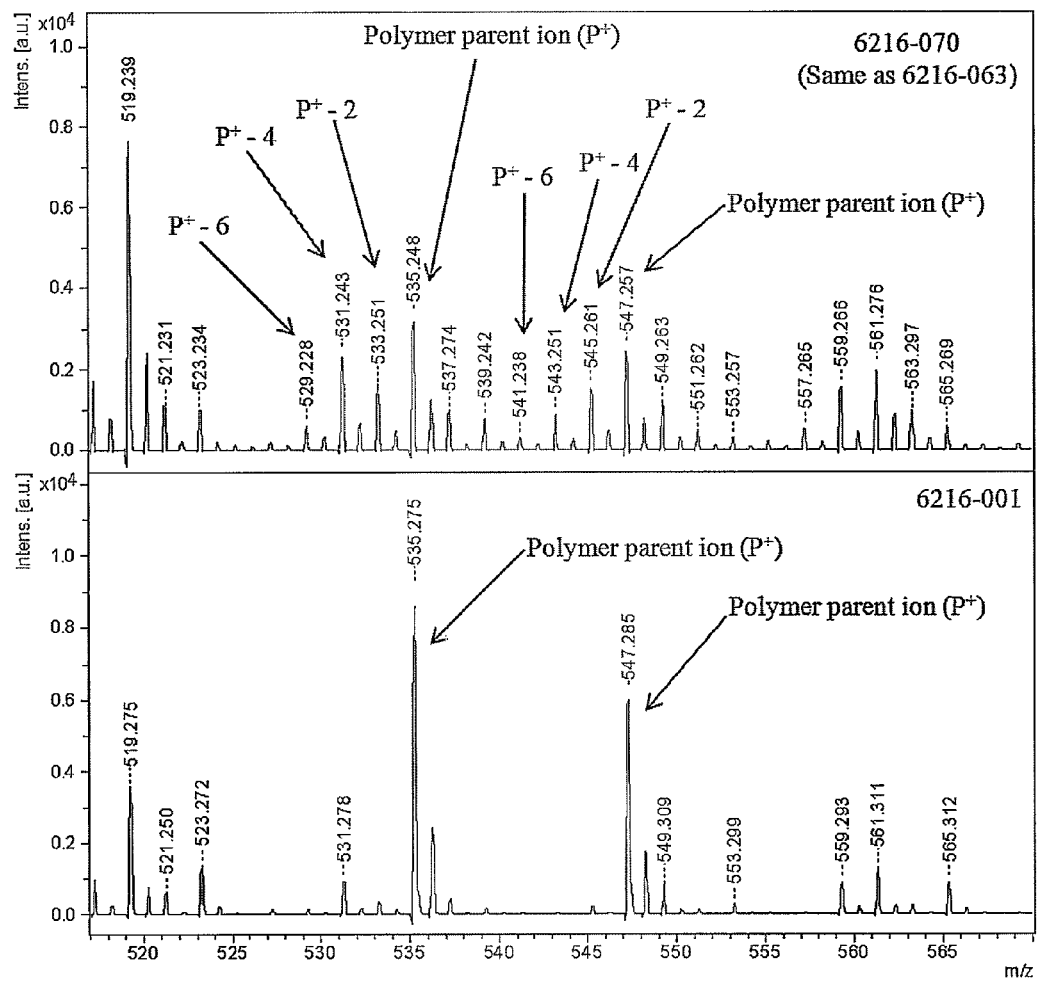
FIG. 8 expands "Cluster 1" of the Matrix Assisted Laser Desorption Ionization—Time of Flight Mass Spectroscopy data for polymer Samples 6216-070 (FIGS. 8a) and 6216-001 (FIG. 8b) that was illustrated in FIGS. 6 and 7.

Referring to FIG. 8, more particularly contrasting FIGS. 8a and 8b, when the 440-600 m/z cluster portion is examined closer, it is determined that the 070 sample contains parent ion peaks (P+) that are followed by P+−2, P+−4, P+−6 peaks. These peak patterns are strongly indicative of multiple double bonds being formed, thus leading to a fluorescent quantity of conjugated double bonds responsible for the fluorescent property of the higher temperature processed polymers, i.e., 6216-029, 6216-032, 6216-063, and 6216-070.

As can be seen from comparing the two analyses, conjugated double bonds in the 070 sample comprise at least 10% of the chemical bonds of the polymer backbone. The conjugated double bonds appear to comprise approximately 20% of the chemical bonds of the polymer backbone.

An exemplary method of preparing a polymer according to the present disclosure follows, which is not meant to be limiting.

POLYMER PREPARATION EXAMPLE

The following example should not be construed as limiting.

Fluorescent-grade Acrylic Acid/Tetraethylene Pentamine Polymer Backbone Synthesis:

Note: Weight percentages recited in this section are based on the final product in water.

Tetraethylene pentamine ("TEPA") (37.556 weight percent) and sulfuric acid (0.199 weight percent) was charged into a glass reactor fitted with a mechanical stirrer and a condenser. While purging the headspace with nitrogen and stirring, acrylic acid (14.3.04 weight percent) was added dropwise over 30 min where the temperature was maintained between 130 and 140° C. during the addition, allowing the exotherm from the acid-base reaction to reach the desired temperature.

Next, the resulting reaction mixture was heated to the appropriate temperature as listed in Table 1, for this particular example, 225° C. This temperature was held for 4.5 hrs while collecting the condensate in a Dean-Stark trap. After 4.5 hrs, the polymer melt was allowed to cool to 120° C. and then slowly diluted with deionized water (47.941 weight percent) keeping the temperature above 90° C. during the dilution. The resulting approximately 50 weight percent polymer solution was then cooled to room temperature. Weight average molecular weight of the polymer was determined to be 3,000 Daltons using a size exclusion chromatography method and polysaccharide standards. The polymer solution exhibits a broad fluorescence around 480 nm when excited around 360 nm.

Functionalization of Polymer Backbone

Note: Weight percentages recited in this section are based on the final product in water. Fluorescent-grade acrylic acid/TEPA polymer (31.477 weight percent), deionized water (36.825 weight percent), and Dowfax 2A1 (0.118 weight percent) were then added to a round bottom flask fitted with a mechanical stirrer. Next, a 50% NaOH solution (8.393 weight percent) was added to the stirring reaction mixture. Once the mixture was heated and maintained at 40° C., carbon disulfide (14.794 weight percent) was added drop-wise over 2 hrs. One hour into the carbon disulfide addition, another amount of 50% NaOH (8.393 weight percent) was charged. The reaction mixture was maintained at 40° C. for an additional 2 hrs after the first two-hour period. Finally, the mixture was cooled to room temperature and filtered through filter paper to obtain an approximately 35 weight percent polymeric polydithiocarbamate product. The polymer solution exhibited a broad fluorescence around 480 nm when excited around 360 nm after reducing pH of solution below pH 4. The polymer produced from this example is an embodiment of a fluorescing metal-scavenging polymer.

B. Dosage

The dosage or amount of the disclosed polymers that is utilized in various metal scavenging processes may vary. Process medium quality and extent of process medium treatment are two factors that may influence the desired dosage amount. A jar test analysis is a typical example of what is utilized as a basis for determining the dosage required to achieve effective metal scavenging in the context of a process water medium, e.g., wastewater.

The dosages can be based on the amounts of fluorescing metal-scavenging polymer added to the medium. Alternatively, the dosages can be based on the amount of functional groups present in the fluorescing metal-scavenging polymer. Furthermore, the dosages can be based on a combination of the two amounts, plus any of several process variables.

In certain embodiments, the amount of fluorescing metal-scavenging polymer capable of effectively scavenging at least one metal from a medium is preferably within the range of 0.2 to 2 moles of dithiocarbamate functional groups per mole of metal that is sought to be scavenged. More preferably, the dosage is 1 to 2 moles of dithiocarbamate functional groups per mole of metal in the medium. The metal polymer complexes formed are generally self flocculating and quickly settle. These flocculants are then easily separated from the treated water.

In the context of applying the polymer to a gas system, such as a flue gas, the polymer can be dosed incrementally and capture rates for a particular metal, e.g., mercury, can be calculated by known techniques in the art. In certain embodiments, the fluorescing metal-scavenging polymer is dosed from 0.5 to 500 ppm. In other embodiments, the fluorescing metal-scavenging polymer is dosed from 1 to 300 ppm. In certain other embodiments, the fluorescing metal scavenging polymer is dosed from 2 to 200 ppm.

C. Methods

The present disclosure provides for a method of removing at least one metal from a medium comprising the at least one metal, the method comprising: treating the medium comprising the at least one metal with a polymer, the polymer comprising a polymer backbone, the polymer backbone comprising chemical bonds, the polymer backbone derived from at least two monomers: acrylic-x and an alkylamine, and wherein the acrylic-x has the following formula:

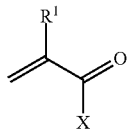

wherein X=OR, OH and salts thereof, or $NHR^2$, wherein R is independently selected from an alkyl group, an aryl group, and an alkene group; and wherein $R^1$ and $R^2$ are independently selected from H, an alkyl group, an aryl group, and an alkene group; wherein the molecular weight of the polymer backbone is between 500 to 200,000 Daltons; wherein the chemical bonds of the polymer backbone are comprised of a fluorescing quantity of conjugated double bonds; and wherein the polymer is functionalized by attaching to the polymer backbone a functional group capable of scavenging the at least one metal; allowing the polymer to scavenge a quantity of the at least one metal to create a scavenged compound; and collecting the scavenged compound.

The polymers and compositions as described above are incorporated into this section and can be applied within the claimed methodologies.

The target metal or metals of interest will depend on the system/medium to be treated.

The at least one metal can include zero valent, monovalent, and multivalent metals. The at least one metal may or may not be ligated by organic or inorganic compounds. Also, the at least one metal can be radioactive or nonradioactive.

Examples of the at least one metal include, but are not limited to, transition metals and heavy metals. Specific metals can include, but are not limited to at least one of the following: copper, nickel, zinc, lead, mercury, cadmium, silver, iron, manganese, palladium, platinum, strontium, selenium, arsenic, cobalt, gold, and combinations thereof.

In certain embodiments, the at least one metal is at least one of the following: copper, nickel, zinc, lead, mercury, cadmium, silver, iron, manganese, palladium, platinum, strontium, selenium, arsenic, cobalt and gold.

In certain embodiments, the at least one metal is a transition metal.

In certain embodiments, the at least one metal is a heavy metal.

The medium comprising the at least one metal can vary and, though not limiting, may include at least one of the following: wastewater streams, liquid hydrocarbonaceous streams, flue gas streams, flyash, and other particulate matter. Various industrial processing steps can be coupled with metals removal, including, but not limited to, filtration steps and/or air quality control devices, e.g., baghouses and electrostatic precipitators and other air quality control devices.

Media comprising a liquid phase (or a medium comprised of a liquid phase) are potential targets. In certain embodiments, the medium comprising the at least one metal is a liquid phase medium.

In certain embodiments, the medium is a process stream comprising water, e.g., wastewater or wastewater from a power plant or industrial setting (power plant, mining operation, waste incineration, and/or manufacturing operation).

In certain embodiments, the medium is a liquid hydrocarbonaceous stream common in petroleum refining processes or petrochemical processes. Examples include streams from processes that utilize or produce petroleum hydrocarbons such as petroleum hydrocarbon feedstocks including crude oils and fractions thereof such as naphtha, gasoline, kerosene, diesel, jet fuel, fuel oil, gas oil vacuum residual, etc., or olefinic or napthenic process streams, ethylene glycol, aromatic hydrocarbons, and derivatives thereof.

In certain embodiments, additional chemistries, flocculants, and/or coagulants can be utilized in conjunction with the fluorescing metal-scavenging polymers disclosed herein. The chemistries, flocculants, and/or coagulants applied to a medium comprising at least one metal can vary and may include the addition of at least one of the following: cationic polymers, anionic polymers, amphoteric polymers, and zwitterionic polymers.

In certain embodiments according to the methods disclosed herein, the method further comprises a second treatment to the medium comprising the at least one metal with a complexing amount of a water soluble ethylene dichloride ammonia polymer having a molecular weight of from 500 to 100,000 Daltons and functionalized from 5 to 50 percent with dithiocarbamate salt groups. In other embodiments, the molecular weight of the polymer backbone of the water soluble ethylene dichloride ammonia polymer is from 1500 to 5000 Daltons and is functionalized from 15 to 50 percent with dithiocarbamate salt groups. In yet other embodiments, the molecular weight of the polymer backbone of the water soluble ethylene dichloride ammonia polymer is from 1500 to 5000 and is functionalized from 25 to 40 percent with dithiocarbamate salt groups.

In certain embodiments, the fluorescing metal-scavenging polymer treatment and additional treatment are added in a ratio of 1:1.

In certain embodiments, media comprising a gas phase medium (or a medium comprising a gas phase) are a target for the present disclosure. In addition, processes comprising a liquid and/or gas phase medium are encompassed by this disclosure as well.

In certain embodiments, the medium is part of a heat generating system, e.g., a flue gas stream.

In certain embodiments, the heat generating system is at least one of the following: a combustion system; a power plant combustion system; a coal combustion system; a waste incineration system; a kiln; a kiln for mining or cement operations; and an ore processing system.

In certain embodiments, the methods further comprise applying an oxidizing agent to a heat generating system flue gas stream. In other embodiments, the oxidizing agent is applied upstream from the fluorescing metal-scavenging polymer treatment.

In certain embodiments, a multiphase treatment protocol for a process comprises treating a gas and a liquid, e.g., at least one metal in a gas, such as elemental mercury or derivatives thereof, and at least one metal in a liquid. This can involve the fluorescing metal-scavenging polymer treatment and the additional treatment as described above.

In certain embodiments, the oxidizing agent is at least one of the following: a thermolabile molecular halogen, calcium bromide, and a halogen comprising compound.

In certain embodiments where the medium containing the at least one metal comprises a flue gas, the methods may further comprise applying an oxidizing agent to the flue gas. In such methods, the oxidizing agent oxidizes a target metal species, typically elemental mercury or derivatives thereof, at a temperature of at least 500° C., or a temperature where the oxidant is capable of oxidizing molecular mercury that exists in a process that generates mercury; optionally wherein the target species is elemental mercury or derivatives thereof; and optionally wherein the oxidizing agent is at least one of the following: a thermolabile molecular halogen, calcium bromide, or a halogen comprising compound. Mercury oxidant methodologies are described in U.S. Pat. Nos. 6,808,692 and 6,878,358, which are herein incorporated by reference.

In certain embodiments, the treating of a medium with the fluorescing metal-scavenging polymer occurs at a temperature no greater than about 300° C., preferably no greater than about 250° C.

In certain embodiments, the methods further comprise adjusting the medium to an acidic pH after the collecting. The pH of the medium may be adjusted to less than 5, less than 4, or less than 3, after the collecting.

METHOD EXAMPLES

The following examples should not be construed as limiting.

Synthetic Cu-EDTA-Containing Wastewater:

As the fluorescing metal-scavenging polymer derived from the reaction of carbon disulfide with poly(acrylic acid/tetraethylene pentamine) reacts with heavy metals, it precipitates both the metals and the polymer from the solution as metal-polymer complexes. Removal of the heavy metals is dependent on multiple parameters that include (not all encompassing) dose, mixing, and time. Thus, at any time during the fluorescing metal-scavenging polymer treatment, unprecipitated residual fluorescing metal-scavenging polymer may remain in solution and exhibit fluorescence. It can then be extrapolated that a relationship may be drawn between residual unprecipitated fluorescing metal-scavenging polymer concentration and the remaining soluble heavy metals concentration within the treated aqueous stream. This relationship may be drawn upon in a way to control the dosage of the fluorescing metal-scavenging polymer relative to the changing composition/flows of media being treated. A series of jar tests were performed in different aqueous streams comprising heavy metals to test this concept.

The jar testing procedure is described below and under "Wastewater Testing Analysis" in the incorporated patent applications. The same testing procedure was performed using the fluorescing metal-scavenging polymer with the addition of performing fluorescence measurements on samples taken after filtration and pH adjustment of the filtrate to pH<4.

Jar Test Procedure:

Three-hundred-milliliter samples (jars) of synthetic Cu-EDTA-containing wastewater were placed in 500 mL beakers and set up on a gang stirrer. The samples were mixed at 150 revolutions per minute (rpm) while the fluorescing metal-scavenging polymer was dosed into the samples. The dosages of the fluorescing metal-scavenging polymer used in each sample of this Example are illustrated in Table 2 and FIG. 9. The mixing at 150 rpm was continued for a total of 10 minutes. This was then followed by a slow mix (35 rpm) for 10 minutes. After the mixing was completed, the precipitate was allowed to settle, undisturbed, for an additional 10 minutes. Next, the water samples were filtered through 0.45 micron filters. The filtrate was then acidified to pH=2 with concentrated nitric acid to stop any further precipitation of the copper. Residual soluble copper was determined in the filtered water samples by atomic absorption analysis using copper standards for reference. One set of jars was run for each polymer tested.

Figure 9:
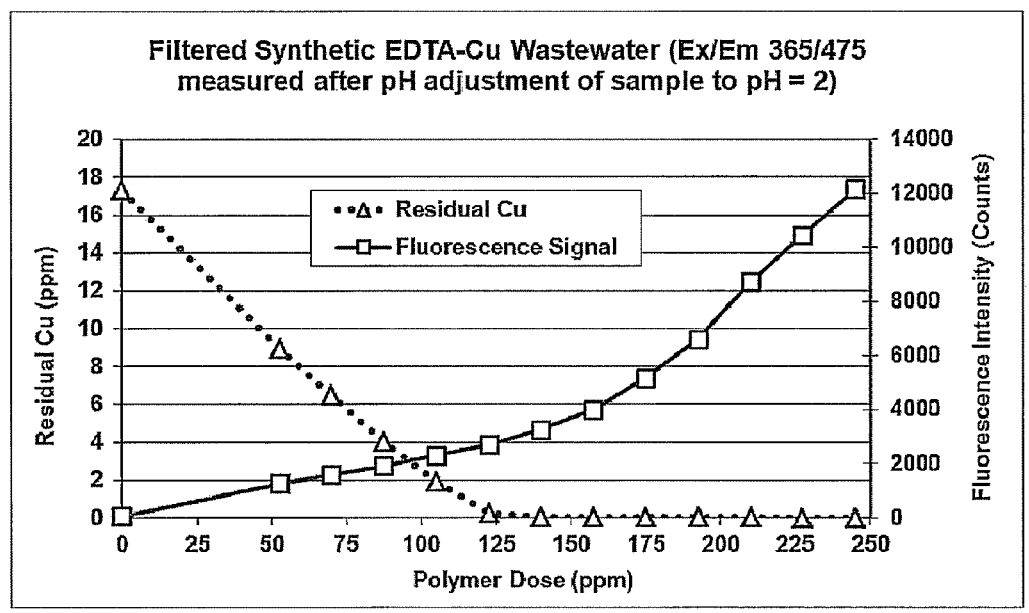
FIG. 9 illustrates the results of a series of jar tests of a fluorescing metal-scavenging polymer on synthetic Cu-EDTA wastewater having a pH=8 and the fluorescence intensity measured on a pH adjusted sample after completion of the jar tests at each polymer dose.

FIG. 9 illustrates the results of jar testing of the disclosed fluorescing metal-scavenging polymer on synthetic Cu-EDTA-containing wastewater having pH=8 and the fluorescence intensity measured on a pH-adjusted sample after completion of the jar tests at each dose. Noteworthy is the increase of intensity as the copper is removed, thus indicating an increase in residual unprecipitated fluorescing metal-scavenging polymer.

Table 2 below illustrates tabulated results from filtered jar testing shown in FIG. 9 with calculated residual fluorescing metal-scavenging polymer based on the calibration curve shown in FIG. 5. The amount of residual polymer needed to achieve metals removal targets will vary depending on the matrix components of the medium, the concentration of the target metals, and the contact/mixing time of the target metals with the fluorescing metal-scavenging polymer relative to actual dosing of the fluorescing metal-scavenging polymer.

TABLE 2

Results from filtered jar testing for synthetic Cu-EDTA-containing wastewater.

Figure 5:
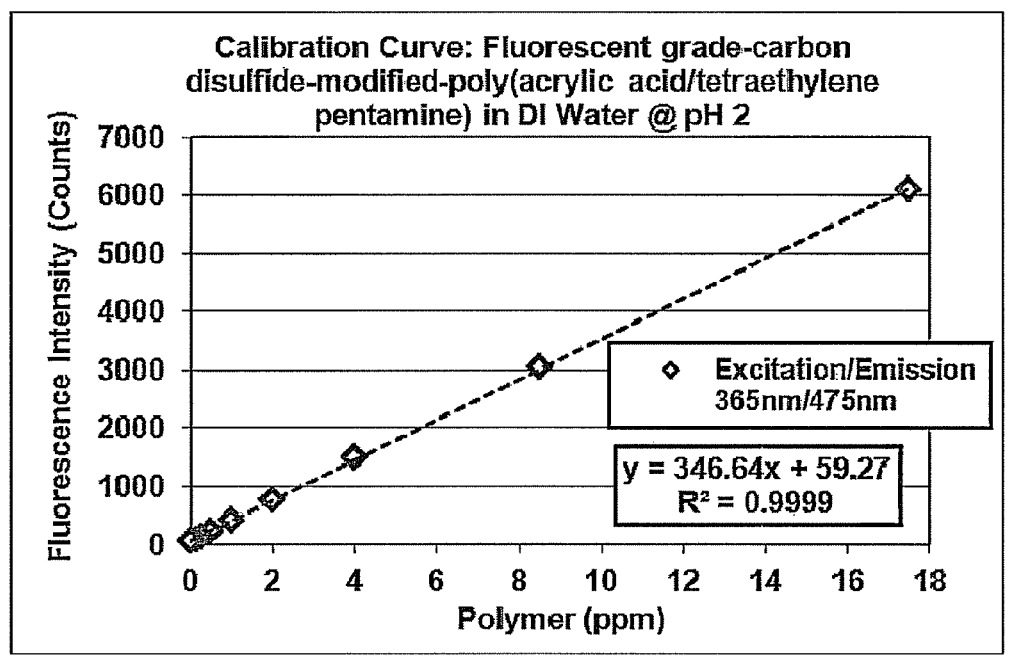
FIG. 5 illustrates the linear relationship between fluorescence intensity and carbon disulfide-modified-poly(acrylic acid/tetraethylene pentamine) concentration.

| Sample No. | Polymer Sample | Polymer Dose (ppm) | Reaction Time (min.) | Residual Cu (ppm) | Ex/Em: 365 nm/ 475 nm Fluorescence Intensity (counts) | Residual polymer (ppm) based on calibration curve of FIG. 5 |
|---|---|---|---|---|---|---|
| 1 | Blank filtered | 0 | 0 | 17.32 | 59 | 0 |
| 2 | 6216-065** | 53 | 20 | 8.97 | 1265 | 3.3 |
| 3 | 6216-065 | 70 | 20 | 6.52 | 1605 | 4.3 |
| 4 | 6216-065 | 88 | 20 | 4.01 | 1933 | 5.2 |
| 5 | 6216-065 | 105 | 20 | 1.93 | 2310 | 6.3 |
| 6 | 6216-065 | 123 | 20 | 0.24 | 2703 | 7.5 |
| 7 | 6216-065 | 140 | 20 | 0.05 | 3263 | 9.1 |
| 8 | 6216-065 | 158 | 20 | 0.04 | 4008 | 11.2 |
| 9 | 6216-065 | 175 | 20 | 0.03 | 5175 | 14.6 |
| 10 | 6216-065 | 193 | 20 | 0.03 | 6615 | 18.7 |
| 11 | 6216-065 | 210 | 20 | 0.03 | 8715 | 24.8 |
| 12 | 6216-065 | 228 | 20 | 0.02 | 10460 | 29.8 |
| 13 | 6216-065 | 245 | 20 | 0.02 | 12170 | 34.8 |

**All 6216-065 samples are dithiocarbamate-functionalized 6216-063 backbones.

Industrial Process Water from a Steel Processing Plant:

A series of jar tests were performed on water collected from a steel processing plant with the need to lower residual nickel to below 1 ppm. Jar tests were performed in a similar fashion as described for the synthetic Cu-EDTA-containing wastewater.

Figure 10:
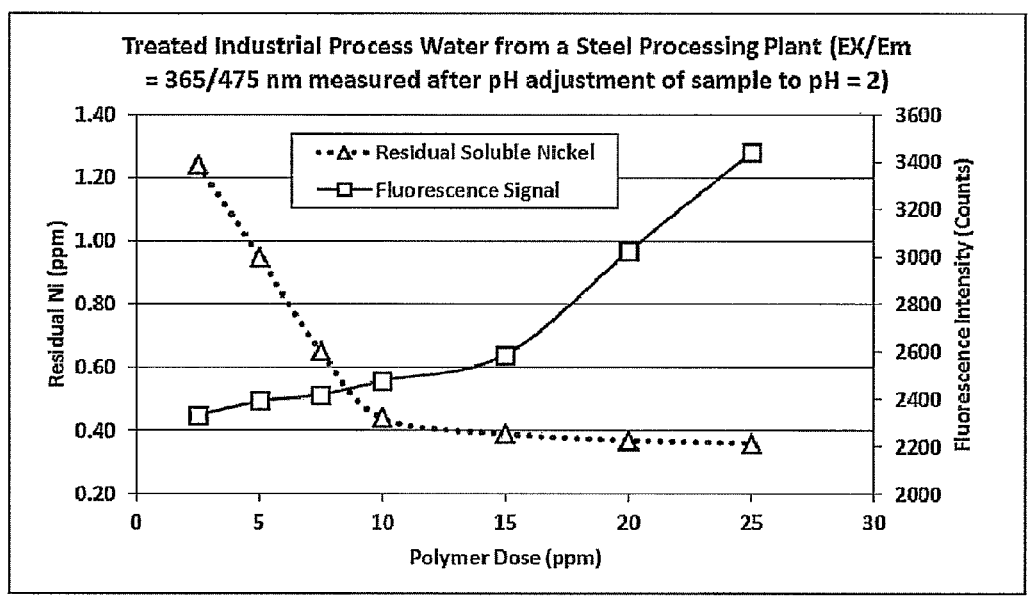
FIG. 10 illustrates the results of a series of jar tests using the disclosed fluorescing metal-scavenging polymer for nickel removal from a sample of industrial process water and the fluorescence intensity measured on a pH adjusted sample after completion of the jar tests at each dose.

FIG. 10 and Table 3 illustrate the results of jar testing using Sample 6216-063 on actual samples of industrial process water and the fluorescence intensity measured on a pH-adjusted sample (pH=2) after filtering the jar tests at each dose. Notice the increase of intensity as most of the nickel is removed, thus indicating an increase in residual unprecipitated fluorescing metal-scavenging polymer.

TABLE 3

Tabular results from filtered jar testing shown in FIG. 10.

| Sample No. (all 6216-072***) | Polymer Dose (ppm) | Residual Soluble Ni (ppm) | Fluorescence Intensity (counts) |
|---|---|---|---|
| Blank | 0 | 1.27 | N/A |
| 1 | 2.5 | 1.24 | 2330 |
| 2 | 5.0 | 0.95 | 2391 |
| 3 | 7.5 | 0.65 | 2418 |
| 4 | 10 | 0.44 | 2477 |
| 5 | 15 | 0.39 | 2586 |
| 6 | 20 | 0.37 | 3022 |
| 7 | 25 | 0.36 | 3441 |

***All 6216-072 samples are dithiocarbamate-functionalized 6216-070 backbones.

Figure 11:
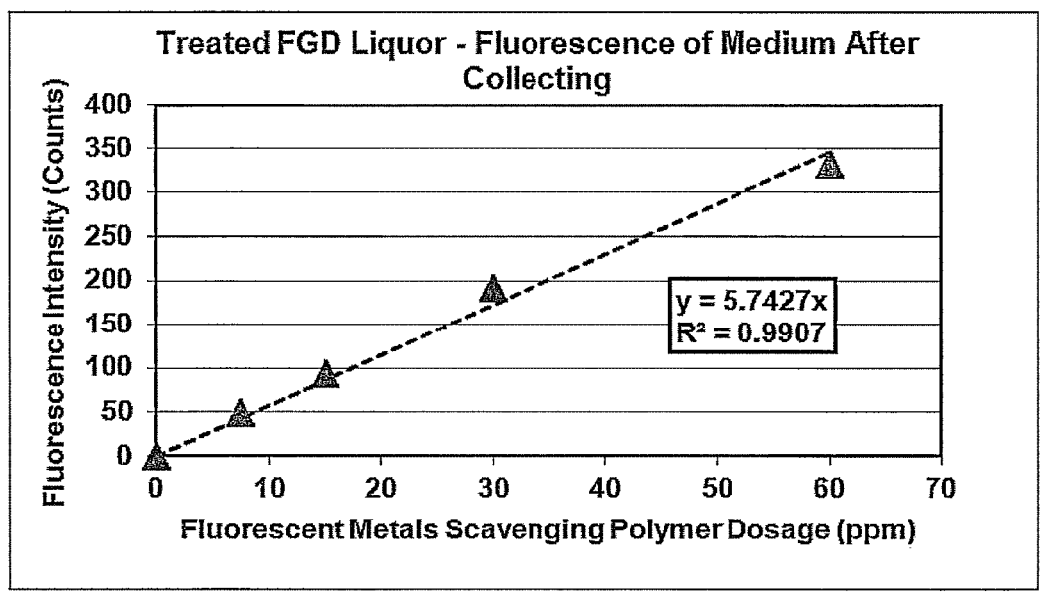
FIG. 11 illustrates fluorescence intensity (background subtracted) as a function of increasing the dosage ratio of fluorescing metal-scavenging polymer for mercury removal from wet flue gas desulfurization ("FGD") liquor for mercury removal (see Table 4 for mercury measurements)

Flue Gas Desulfurization Liquor:

A series of jar tests were performed on water collected from a wet flue gas desulfurization ("FGD") scrubber at a coal-burning power plant. The water had several heavy metals present, yet the target heavy metal in this case was mercury. Jar tests were performed in which increasing amounts of the fluorescing metal-scavenging polymer were added to the wet FGD liquor from a coal-fired power plant. The jar tests were done at 7.5, 15, 30, and 60 ppm polymer and followed this procedure:

1. 300 mL of wet FGD liquor was added to jars controlled at 50° C. to simulate typical wet FGD scrubber conditions (typical operating pH=5.5).
2. Fluorescing metal-scavenging polymer was added to the jars.
3. The samples were mixed at fast speed for 10 min
4. The samples were then mixed at slow speed for 10 min
5. The samples were allowed to settle for 10 min
6. The samples were filtered with 0.45 μm syringe filter
7. $H_2SO_4$ was added to the filtrate samples to lower pH to 2
8. The temperature of the filtrate samples were maintained at 50° C. until fluorescence measurement The results of these tests are shown in Table 4 and FIG. 11. It can be seen from Table 4 and FIG. 11 that even at very low dosages of the fluorescing metal-scavenging polymer (7.5 ppm), the fluorescing metal-scavenging polymer removes nearly all of the mercury from the wet FGD liquor. Furthermore, as the mercury is removed, the residual fluorescing metal-scavenging polymer concentration left in solution increases leading to a linear increase in fluorescence.

TABLE 4

Mercury concentration and fluorescence intensity in wet FGD liquor as a function of fluorescing metal-scavenging polymer dosage.

| Polymer dosage (ppm) (all 6216-072) | Post-filtration Hg concentration (ppt) | Background-corrected fluorescence intensity (counts) |
|---|---|---|
| 0 | 83073 | 0 |
| 7.5 | 34 | 49 |
| 15 | 31 | 94 |
| 30 | 42 | 192 |
| 60 | 34 | 332 |

To examine whether the detected residual fluorescing metal-scavenging polymer continues to remove metals as more mercury enters the wet FGD liquor, two more jar tests were performed in which additional wet FGD liquor was added after the filtration step no. 6 on two jar tests already treated (30 and 60 ppm). After step no. 6, 100 mL of additional wet FGD liquor was added to each of these jars. The jar contents were mixed again at a fast speed for 5 mins, then at a slow speed for 5 mins, and finally allowed to settle for 5 mins. Then step nos. 6-8 were performed. Through the addition of 100 mL of more wet FGD liquor to the 30 and 60 ppm dosage jars, the calculated fluorescing metal-scavenging polymer dosages could be recalculated to be 23 and 45 ppm, respectively. The results with these two points included are shown in the arrowed lines of Table 5 and the "hollow" points of FIG. 12.

Figure 12:
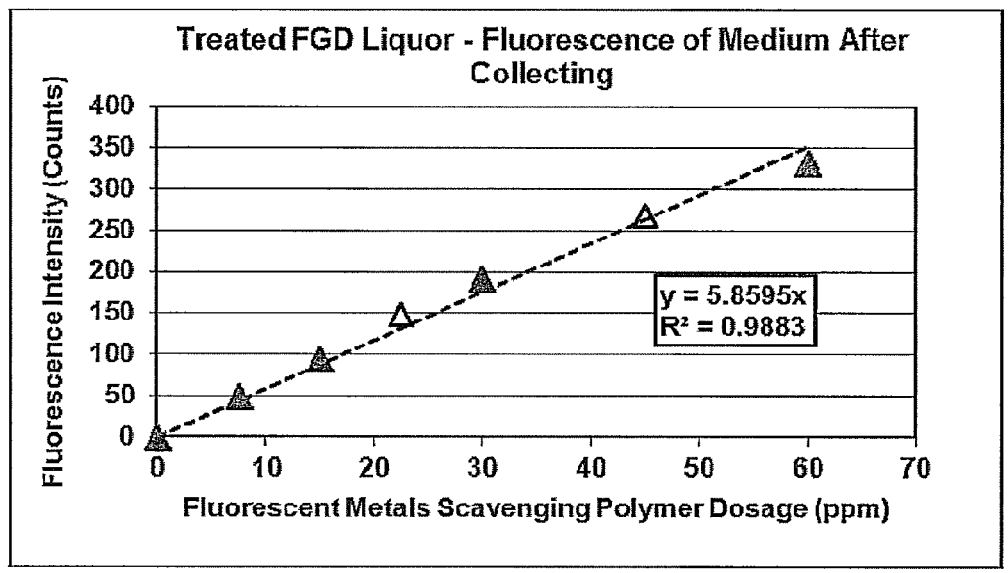
FIG. 12 illustrates the fluorescence intensity of residual polymer as a function of increasing dosage of the fluorescing metal-scavenging polymer, with the "hollow" points representing the jars with additional wet FGD liquor added after the preceding treatment (see Table 5 for mercury measurements).

It can be seen in Table 5 that despite adding an additional 100 mL of mercury-comprising wet FGD liquor, the end mercury concentration is nearly as low as the jars using the original 30 and 60 ppm dosages without the extra wet FGD liquor addition, indicating that the mercury continues to be removed significantly by the still active, detected residual fluorescing metal-scavenging polymer. Furthermore, as shown in FIG. 12, the residual fluorescing metal-scavenging polymer continues to fluoresce in a linear response when plotted using the recalculated concentration.

TABLE 5

Mercury concentration and fluorescence intensity in wet FGD liquor as a function of fluorescing metal-scavenging polymer dosage, where the arrowed rows are the jars with extra wet FGD liquor added after previous treatment.

| Polymer dosage (ppm) (from 6216-072) | Post-filtration Hg concentration (ppt) | Background-corrected fluorescence intensity (counts) |
|---|---|---|
| 0 | 83073 | 0 |
| 7.5 | 34 | 49 |
| 15 | 31 | 94 |
| →23 | 74 | 148 |
| 30 | 42 | 192 |
| →45 | 93 | 268 |
| 60 | 34 | 332 |

FIG. 12 illustrates the fluorescence intensity of the residual polymer as a function of increasing dosage of the fluorescing metal-scavenging polymer. The "hollow" points represent the jars with extra wet FGD liquor added after previous treatment as discussed above.

Jar tests were also performed in which, instead of an additional 100 mL of mercury-comprising wet FGD liquor added, 100 mL of deionized water was added. This test was performed to confirm that the changes in fluorescence intensity observed were in fact due to the polymer reacting with the metals and not just a dilution effect. This test showed a non-linear relationship between the fluorescing metal-scavenging polymer dosage and fluorescence intensity, indicating that what is seen in FIG. 12 and Table 5 is in fact due to the polymer reacting with the metals and not a dilution effect.

All patents referred to herein, are hereby incorporated herein by reference, whether or not specifically clone so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present disclosure. It is to be understood that no limitation with respect to the illustrated specific embodiments or examples is intended or should be inferred. The disclosure is intended to cover by the appended claims all such modifications as fall within the scope of the claims.

We claim:

1. A method of removing at least one metal from a medium comprising the at least one metal, the method comprising:
    treating the medium comprising the at least one metal with a polymer, the polymer comprising a polymer backbone, the polymer backbone comprising chemical bonds, the polymer backbone derived from at least two monomers: acrylic-x and an alkylamine, and wherein the acrylic-x has the following formula:

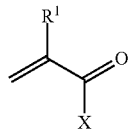

wherein X=OR, OH and salts thereof, or $NHR^2$, wherein R is independently selected from an alkyl group, an aryl group, and an alkene group; and wherein $R^1$ and $R^2$ are independently selected from H, an alkyl group, an aryl group, and an alkene group; wherein the molecular weight of the polymer backbone is between 500 to 200,000 Daltons; wherein the chemical bonds of the polymer backbone are comprised of a fluorescing quantity of conjugated double bonds; and wherein the polymer is functionalized by attaching to the polymer backbone a functional group capable of scavenging the at least one metal;
    allowing the polymer to scavenge a quantity of the at least one metal to create a scavenged compound; and
    collecting the scavenged compound.

2. The method of claim 1, wherein the functional group comprises at least one sulfide compound.

3. The method of claim 1, wherein the functional group is a dithiocarbamate salt group and wherein the polymer is between 5 to 100 percent functionalized with the dithiocarbamate salt group based upon the total possible functionalization of the polymer backbone.

4. The method of claim 1, wherein the at least one metal is selected from the group consisting of: copper, nickel, zinc, lead, mercury, cadmium, silver, iron, manganese, palladium, platinum, strontium, selenium, arsenic, cobalt, gold, and any combination thereof.

5. The method of claim 1, further comprising a second treating of the process stream with a complexing amount of a water soluble ethylene dichloride ammonia polymer having a molecular weight of from 500 to 100,000 Daltons and functionalized from 5 to 50% with dithiocarbamate salt groups.

6. The method of claim 1, further comprising: applying an oxidizing agent to a heat generating system flue gas; optionally wherein the oxidizing agent oxidizes a target species at a temperature of at least 500° C.; optionally wherein the target species is elemental mercury or derivatives thereof; and optionally wherein the oxidizing agent is at least one of the following: a thermolabile molecular halogen, calcium bromide, and a halogen comprising compound.

7. The method of claim 1, wherein the method further comprises adjusting the medium to an acidic pH after the collecting.

8. The method of claim 1, wherein the polymer backbone has been polymerized within a temperature range of greater than 160 degrees Celsius to 225 degrees Celsius.

9. The method of claim 1, wherein the polymer backbone has been polymerized at a temperature of 225 degrees Celsius.

10. The method of claim 1, wherein the alkylamine has a range of carbon atoms from 2 to 14, and a range of nitrogen atoms from 2 to 8.

11. The method of claim 1, wherein the conjugated double bonds comprise at least 10% of the chemical bonds of the polymer backbone.

12. The method of claim 1, wherein the polymer is added to the medium as part of a composition, the composition comprising the polymer and at least one additional compound.

13. A polymer comprising a polymer backbone, the polymer backbone comprising chemical bonds, wherein the polymer backbone is derived from at least two monomers: acrylic-x and an alkylamine, and wherein the acrylic-x has the following formula:

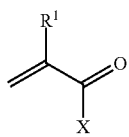

wherein X=OR, OH and salts thereof, or NHR$^2$, wherein R is independently selected from an alkyl group, an aryl group, and an alkene group; and wherein R$^1$ and R$^2$ are independently selected from H, an alkyl group, an aryl group, and an alkene group; wherein the molecular weight of the polymer backbone is between 500 to 200,000 Daltons; wherein the chemical bonds of the polymer backbone are comprised of a fluorescing quantity of conjugated double bonds; and wherein the polymer is functionalized by attaching to the polymer backbone a functional group capable of scavenging at least one metal in a medium.

14. A composition comprising a polymer, the polymer comprising a polymer backbone, the polymer backbone comprising chemical bonds, wherein the polymer backbone is derived from at least two monomers: acrylic-x and an alkylamine, and wherein the acrylic-x has the following formula:

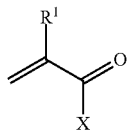

wherein X=OR, OH and salts thereof, or NHR$^2$, wherein R is independently selected from an alkyl group, an aryl group, and an alkene group; and wherein R$^1$ and R$^2$ are independently selected from H, an alkyl group, an aryl group, and an alkene group; wherein the molecular weight of the polymer backbone is between 500 to 200,000 Daltons; wherein the chemical bonds of the polymer backbone are comprised of a fluorescing quantity of conjugated double bonds; and wherein the polymer is functionalized by attaching to the polymer backbone a functional group capable of scavenging at least one metal in a medium.

15. The composition of claim 14, wherein the functional group comprises at least one sulfide compound.

16. The composition of claim 14, wherein the functional group is a dithiocarbamate salt group and wherein the polymer is between 5 to 100 percent functionalized with the dithiocarbamate salt group based upon the total possible functionalization of the polymer backbone.

17. The composition of claim 14, wherein the acrylic-x is acrylic acid or salts thereof, and the alkylamine is selected from the group consisting of: pentaethylenehexamine, tetraethylenepentamine, diethylenetriamine, triethylenetetraamine, ethylenediamine, and any combination thereof; and wherein the molar ratio between acrylic-x and alkylamine is from 0.85 to 1.5; and wherein the molecular weight of the polymer backbone is from 1,500 to 8,000 Daltons; and wherein the functional group is dithiocarbamic acid or salts thereof and the polymer is at least 55 percent functionalized based upon the total possible functionalization of the polymer backbone.

18. The composition of claim 14, wherein the acrylic-x is acrylamide and the alkylamine is selected from the group consisting of: pentaethylenehexamine, tetraethylenepentamine, diethylenetriamine, triethylenetetraamine, ethylenediamine, and any combination thereof and wherein the molar ratio between acrylic-x and alkylamine is from 0.85 to 1.5; and wherein the molecular weight of the polymer backbone is from 1,500 to 8,000 Daltons; and wherein the functional group is dithiocarbamic acid or salts thereof and the polymer is at least 55 percent functionalized based upon the total possible functionalization of the polymer backbone.

19. The composition of claim 14 further comprising water.

20. The composition of claim 14 further comprising at least one metal selected from the group consisting of: copper, nickel, zinc, lead, mercury, cadmium, silver, iron, manganese, palladium, platinum, strontium, selenium, arsenic, cobalt, gold, and any combination thereof.

21. The composition of claim 14 further comprising water soluble ethylene dichloride ammonia polymer having a molecular weight of from 500 to 100,000 Daltons, which is functionalized from 5 to 50 percent with dithiocarbamate salt groups.

22. The polymer of claim 13, wherein the polymer backbone has been polymerized within a temperature range of greater than 160 degrees Celsius to 225 degrees Celsius.

23. The polymer of claim 13, wherein the polymer backbone has been polymerized at a temperature of 225 degrees Celsius.

24. The composition of claim 14, wherein the acrylic-x is selected from the group consisting of: methyl acrylate, methyl methacrylate, ethyl acrylate, ethyl methacrylate, propyl acrylate, propyl methacrylate, and combinations thereof.

25. The composition of claim 14, wherein the acrylic-x is an acrylic ester, and the alkylamine is selected from the group consisting of: ethylenediamine, diethylenetriamine, triethylenetetraamine, tetraethylenepentamine, pentaethylenehexamine, and combinations thereof, and wherein the molar ratio between acrylic-x and alkylamine is from 0.85 to 1.5.

26. The composition of claim 14, wherein the weight average molecular weight of the polymer backbone is from 1,500 to 8,000 Daltons, and wherein the functional group is dithiocarbamic acid or salts thereof and the polymer is at least 55 percent functionalized based upon the total possible functionalization of the polymer backbone.

27. The composition of claim 14, wherein the composition further comprises a quantity of the medium comprising the at least one metal.

28. The composition of claim 14, wherein the alkylamine has a range of carbon atoms from 2 to 14, and a range of nitrogen atoms from 2 to 8.

29. The composition of claim 14, wherein the conjugated double bonds comprise at least 10% of the chemical bonds of the polymer backbone.

30. The polymer of claim 13, wherein the conjugated double bonds comprise at least 10% of the chemical bonds of the polymer backbone.

31. The polymer of claim 13, wherein the functional group comprises at least one sulfide compound.

* * * * *